United States Patent [19]
Taylor et al.

[11] 3,850,804
[45] Nov. 26, 1974

[54] SCREENS FOR WATER INTAKE SYSTEMS
[75] Inventors: Robert F. Taylor, Milwaukee;
Donald A. Strow, Hales Corners;
Hosein Mansouri, New Berlin, all of Wis.
[73] Assignee: Rex Chainbelt Inc., Milwaukee, Wis.
[22] Filed: Dec. 22, 1972
[21] Appl. No.: 317,841

[52] U.S. Cl............... 210/155, 198/174, 198/199, 210/391, 210/400, 210/483, 210/526
[51] Int. Cl............................................. B01d 33/32
[58] Field of Search .......... 210/154, 155, 156, 157, 210/158, 159, 160, 161, 162, 391, 400, 483, 526; 198/172, 174, 198, 199

[56] References Cited
UNITED STATES PATENTS

| 1,188,340 | 6/1916 | Tark | 210/158 |
|---|---|---|---|
| 1,967,050 | 7/1934 | Brackett | 210/160 |
| 2,286,332 | 6/1942 | Bleyer | 210/400 X |
| 2,307,601 | 1/1943 | Nichols | 210/159 |

FOREIGN PATENTS OR APPLICATIONS
319,068  9/1929  Great Britain ..................... 210/160

*Primary Examiner*—Roy Lake
*Assistant Examiner*—Craig R. Feinberg
*Attorney, Agent, or Firm*—Sughrue, Rothwell, Mion Zinn & Macpeak

[57] ABSTRACT

A travelling water screen unit comprises an endless series of pivotally interconnected rectangular screens. Each screen comprises a frame having ends attachable to corresponding links of parallel chains and a screen insert which is separately fabricated and secured by bolts between the central horizontal members of the frame. The debris carried by the flow in a channel is intercepted by the lower, upward moving screens and is removed by backwash sprays from the screens approaching the upper drive and support means. Such units and their intermediate support columns may be set flush and in a straight line so that fish are readily diverted away from the screen.

7 Claims, 5 Drawing Figures

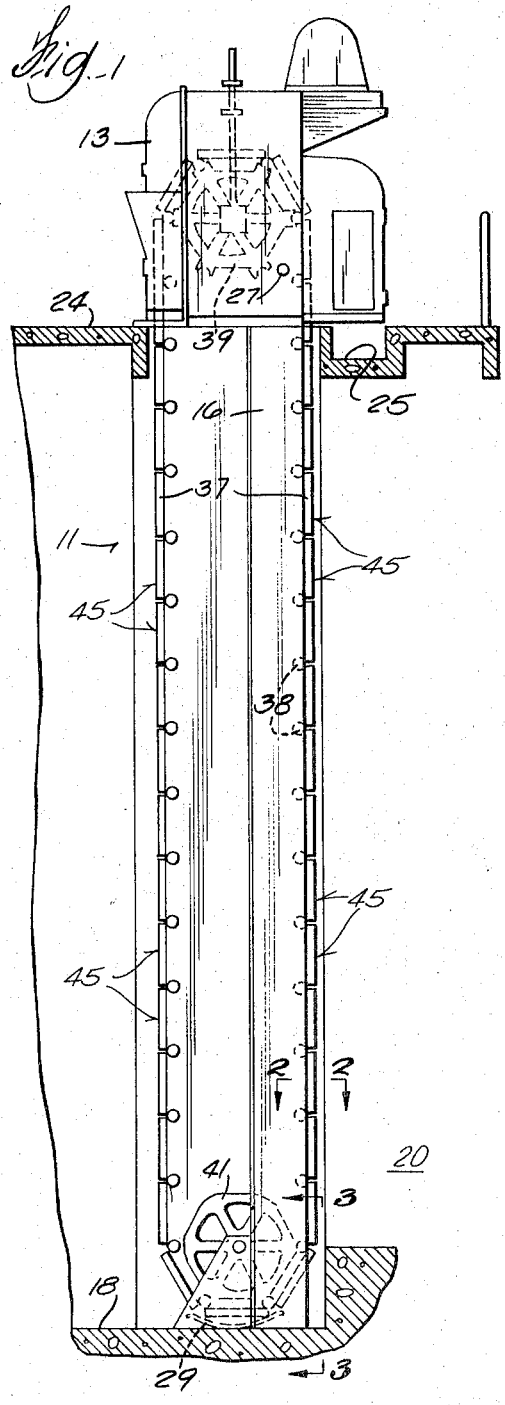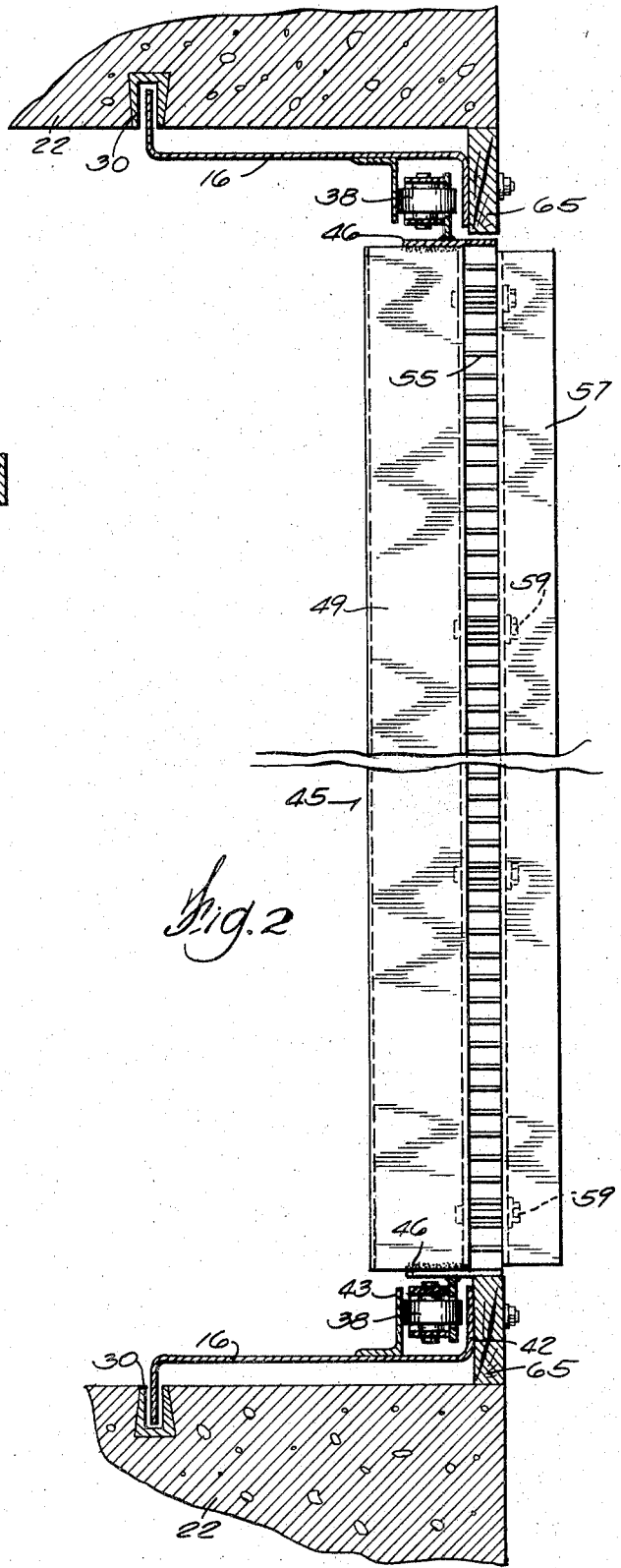

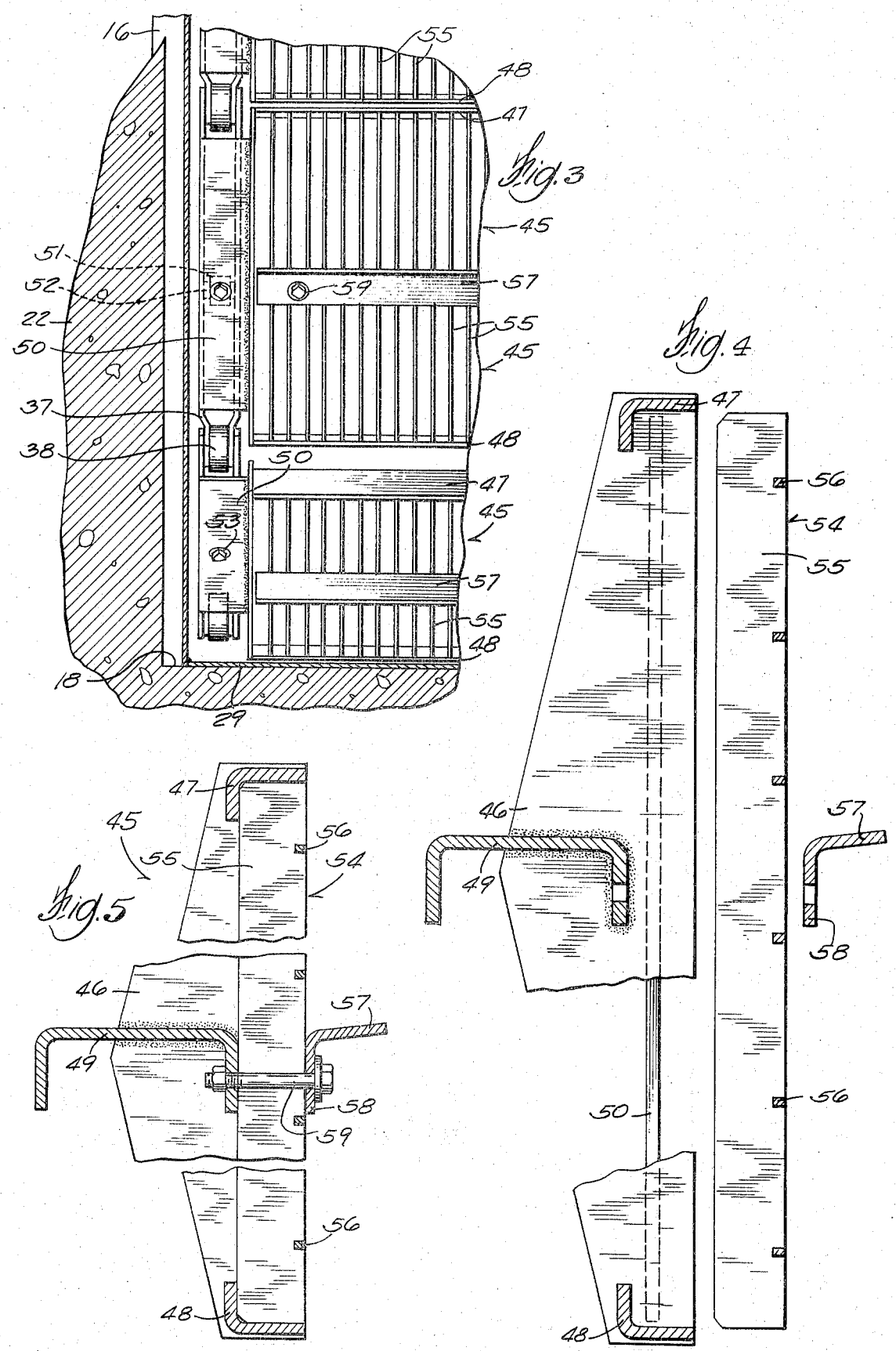

SCREENS FOR WATER INTAKE SYSTEMS

CROSS REFERENCE TO RELATED APPLICATION

The intake system for the fish removal, as referred to, is the subject of copending application of the same title, Ser. No. 317,587 and filed Dec. 22, 1972 by the present inventors.

BACKGROUND OF THE INVENTION

1. Field of the Invention

Flume type endless belt strainer; Endless conveying element structure; Fish Culture.

2. Prior Art

The lower section of a typical travelling water screen is shown in U.S. Pat. No. 2,286,332. A typical travelling water screen for the removal of debris but which includes also provision for the removal and saving of the fish, is shown in U.S. Pat. No. 2,851,162. U.S. Pat. No. 3,508,659 shows a unique screen which is principally for the removal of the fish from a stream and incidentally or necessarily provides for the removal of debris.

BRIEF DESCRIPTION OF THE DRAWINGS

FIG. 1 shows a tavelling water screen unit in side elevation and as installed in a channel shown in longitudinal vertical section.

FIG. 2 is an enlarged section taken on line 2—2 of FIG. 1 and shows the screen unit and adjoining support columns in horizontal section.

FIG. 3 is an enlarged section taken on line 3—3 of FIG. 1 at the lower end of the screen unit and shows a part of the screens in front elevation.

FIGS. 4 and 5 are similar side views of the disassembled and assembled parts of the screen with portions broken away and sectioned.

SUMMARY OF THE INVENTION:

Each screen of a travelling water screen unit includes a rigid frame having upright plate members attachable to the corresponding links of the parallel chains of the unit and upper and lower cross members. A screen insert fits within the frame comprising such members and is held against the flow at its upper and lower margins by rear flanges of the horizontal members and by an intermediate horizontal rear cross-brace having ends secured to the upright members. A shelf for catching debris falling from the screen overlies the insert and is removably secured by bolts extending directly through the insert to the rear bar.

The insert may be readily fabricated of metal or plastic. In particular, walkway grills which are manufactured in quantity at low cost may be readily cut to the size to fit within the frame.

DESCRIPTION OF THE PREFERRED EMBODIMENT

The travelling water screen unit 11 includes an upper drive housing 13 and the spaced upright support posts 16. Posts 16 rest on the floor 18 of channel 20 between the adjoining concrete columns 22 and extend upwardly through the opening in walkway 24 to support the housing 13. Walkway 24 includes the channel 25 to receive the debris which is cleaned from the screens by the water spray from the spray pipe 27 in housing 13. The curved boot plate 29 immediately above the concrete floor 18 joins the lower ends of posts 16 of the unit. Each screen unit 11 is lowered into place and for that purpose, the metal guides 30 are set in the opposite faces of the adjoining columns 22 to receive the oppositely projecting flange of posts 16.

Each screen unit 11 includes parallel endless chains comprising links 37 which are provided with the intermediate guide rollers 38. A chain at each side of the unit operates over the upper driven sprocket 39 in housing 13 and moves downwardly at the rear of the unit to the lower wheel 41. The links 37 of the two chains pass under wheels 41 and as they move upwardly at the front side of the screen unit their rollers 38 enter the parallel guideways between the forward inward-turned flanges 42 of posts 16 and the angle irons 43 welded to the inward facing sides of the posts.

A rectangular screen assembly 45 is disposed between and carried at each side by the respective two corresponding links 37 of the two parallel chains of unit 11. Each screen assembly 45 includes a rigid frame comprising the vertical side plates 46 which are joined at their upper and lower ends by the flanged upper and lower cross-members 47 and 48. The intermediate cross-brace 49 is also secured at its ends to the plates 46. Because of the required rigidity of brace 49, the brace extends, as shown, beyond the plates 46.

The frame of each screen assembly 45 may be variously secured to the corresponding links 37. A preferred construction as shown is also shown in expired U.S. Pat. No. 2,428,757 wherein each side plate 46 is provided with an outwardly projecting shelf plate 50 which overlies the corresponding link and includes a socket 51 which is bolted to the block 52 bridging the two side-bars of the link. Each end of screen assembly 45 is thus readily secured to and removed from the link 37 by means of a single bolt 53.

According to the present invention, the screen of each screen assembly 45 is separately fabricated and is set within the frame of the assembly. As shown, the screen insert 54 comprises the series of vertical bars 55 which are interconnected by the small wires or rods 56 which extend across and are recessed in the front facing edges of the bars. Insert 54 is disposed and supported vertically between the upper and lower cross-members 47 and 48 so that the bars 55 are supported against the flow by the intermediate cross-brace 49 and at their upper and lower ends by the respective rear flanges of the cross-members 47 and 48.

As required periodically, upper sprockets 39 are rotated to lift the forward run of chains 37 and the screen inserts 54 which upon entering housing 13 are cleaned by sprays of water from the spray pipe 27.

Each screen assembly 45 also includes a forward projecting shelf 57 which catches debris from the upward moving screens. This shelf 57 is formed of a bent plate to include the downward mounting flange 58. Each shelf is secured to the assembly with the flange 58 overlying the bars 55 opposite the rear brace 49 so that each shelf 57 is located midway between the upper and lower cross-members 47 and 48 of the assembly. The shelf is secured to the screen by the bolts 59 extending through insert 54 between bars 55 and connecting the flange 58 and cross-brace 49. The shelf thus extends fully across the screen insert 54 and secures the insert in place. Removal of insert 54 thus requires only removal of bolts 59 and shelf 57.

The projecting shelves 57 require suitable provision for sealing the lower end of the screen unit and which includes the curved boot plate 29 extending across the unit beneath the lower wheels 41. The edge of shelf 57 and the front edges of members 47 and 48 are equidistant from the axis of wheels 41 and also follow the curvature of boot plate 29 to maintain a closure at the lower end of the unit. The wooden strips 65 secured to the forward flanges 42 of posts 16 at each side of the unit between the plates 50 and columns 22 serve to seal the installation against flow around the sides of the unit 11.

The construction of each screen in particular allows the front face of the bars 55 to be flush with the strips 65 and front faces of columns 22 where desired or for such purposes as are described in the related copending application referred to. Insert 45 may variously constructed, including without limitation here, of a molded plastic including the bars 55 and cross-connecting elements corresponding to the rods 56. Metal grating is commercially available also in a wide variety such as for walkways. The frame of screen 45 is particularly adapted to receive any such grating which need merely be cut to size to fit between plates 46 and members 47 and 48. Typically, the bars 55 may be two inches deep measured with the flow, one quarter of an inch wide and spaced every two inches. A typical screen assembly is 24 inches in height and may be up to ten feet in width measured across the flow. The cross connecting elements 56 may preferably be located at the rear side of the bars 55. Particularly if the insert 45 is of molded plastic, the connecting elements corresponding to rods 56 would best extend from the front to the rear edges of the bars.

Where required as where the flow approaches the screens at an angle, the strips 65 may be formed of a material to resist wearing by the plates. Alternatively, the surfaces of the strips 65 facing the plates may be overlaid with a suitable wear-resistant material.

We claim:

1. A screen assembly to comprise one of a series of a travelling water screen unit having parallel chains for supporting the same, said screen comprising a rigid frame and a removable screen insert, the frame having upright end members, upper and lower flanged cross-members and an intermediate cross-brace, the insert being disposed to fit between said end members and against the cross-brace and the flanges of said cross-members, and shelf means attached to said cross-brace and overlying the insert to secure the latter in said frame, said screen insert comprising a rigid, rectangular perforate panel of nominal thickness and of a width and height substantially equal to the distances respectively between said end members and said cross members.

2. The screen assembly of claim 1 wherein the insert includes a series of spaced vertical bars, the shelf means includes a projecting surface for catching debris falling from the bars above the shelf and a downward mounting flange and further includes bolts extending between bars from the flange to the cross-brace, the bolts allowing ready removal of the shelf means and the insert from the frame.

3. A screen for a travelling water screen unit which includes parallel chains for supporting an endless series of such screens, said screen comprising a rigid rectangular frame and a removable screen insert in the form of a rectangular panel having upper and lower margins, said frame having upright end members attachable to the corresponding links of the parallel chains of the unit, upper and lower cross members connecting said end members, and an intermediate horizontal rear cross brace having ends secured to said end members, said screen insert being disposed and fitting within the frame comprising such members and abutting the cross members and cross brace so as to be held against the flow centrally of the insert and along its upper and lower margins.

4. The screen of claim 3 wherein the screen insert panel comprises a series of laterally spaced vertical bars and a number of vertically spaced cross connecting elements which join the vertical bars.

5. The screen of claim 3 which further includes a central horizontal shelf for catching debris falling from the screen and having attachment means which overlies the insert and are removably secured by bolts extending directly through the insert to the cross brace.

6. the screen of claim 3 wherein the screen insert panel is of thickness such that, when it is positioned against the intermediate horizontal rear cross brace, its opposite face is flush with the corresponding faces of the upright end members.

7. The screen of claim 3 wherein the screen insert is formed from a walkway grill.

* * * * *